Oct. 27, 1959  J. O. ALMEN  2,910,143
MEANS OF COOLING TRANSMISSION ROLLERS
Filed Aug. 29, 1958

INVENTOR.
JOHN O ALMEN
BY Lyon&Lyon
ATTORNEYS

United States Patent Office 2,910,143
Patented Oct. 27, 1959

2,910,143

MEANS OF COOLING TRANSMISSION ROLLERS

John O. Almen, Sierra Madre, Calif.

Application August 29, 1958, Serial No. 758,067

5 Claims. (Cl. 184—6)

This invention relates to means of cooling transmission rollers, more particularly to means and method of cooling transmission rollers employed in the type of transmission disclosed in my prior patent, No. 2,131,159 issued September 27, 1938, entitled "Cooling Transmission Rollers."

Included in the objects of this invention are:

First, to provide a means of cooling transmission rollers wherein fluid lubricant is directed against the surfaces of the transmission rollers and roller driving and driven raceways in the regions which were, in the immediately preceding instant, in bearing contact so that heat is transferred immediately from these surfaces to the lubricant without appreciable penetration into the transmission rollers or their raceways.

Second, to provide a means of cooling transmission rollers wherein excess lubricant is flung from the transmission rollers and raceways to provide a minimum lubricant film in the regions thereof which are about to enter into bearing engagement so that the lubricant itself offers a minimum contribution as a source of heat or to erosion of the bearing surfaces.

Third, to provide a friction roller transmission which, by reason of the means of its cooling and lubrication, is capable of transmitting maximum power with a minimum loss in friction-generated heat and minimum wear on the bearing surfaces;

Fourth, to provide a means of cooling transmission rollers which, although particularly adapted for the type of transmission shown in the aforementioned patent, is applicable to other types of friction driven mechanisms.

With the above and other objects in view, as may appear hereinafter, reference is directed to the accompanying drawings in which.

Figure 1:
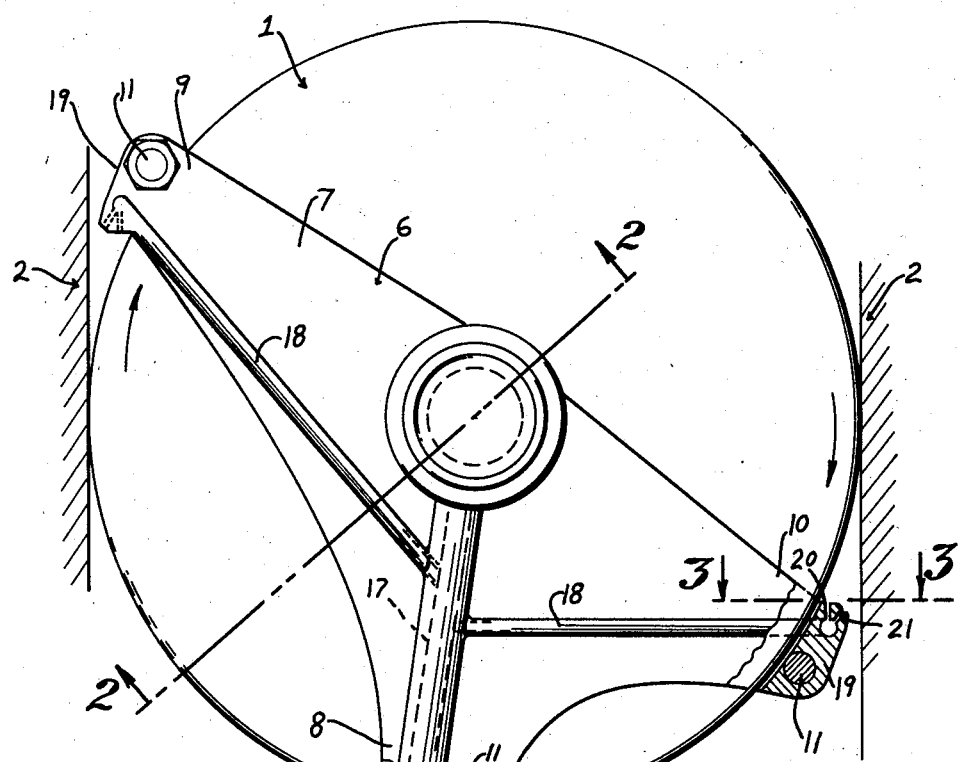
Figure 1 is a partial elevational, partial sectional view of a transmission roller and its carrier yoke with adjacent portions of the raceways and supporting frame structure shown fragmentarily.
Figure 2:
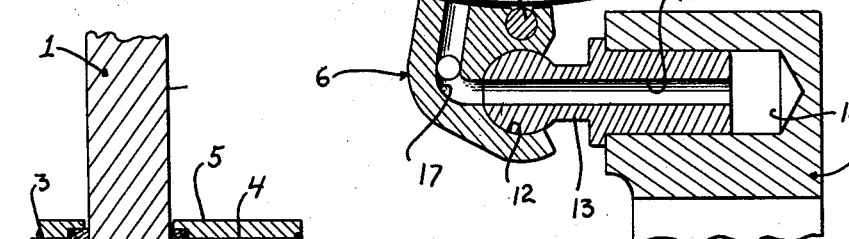
Figure 2 is a fragmentary sectional view through 2—2 of Figure 1.
Figure 3:
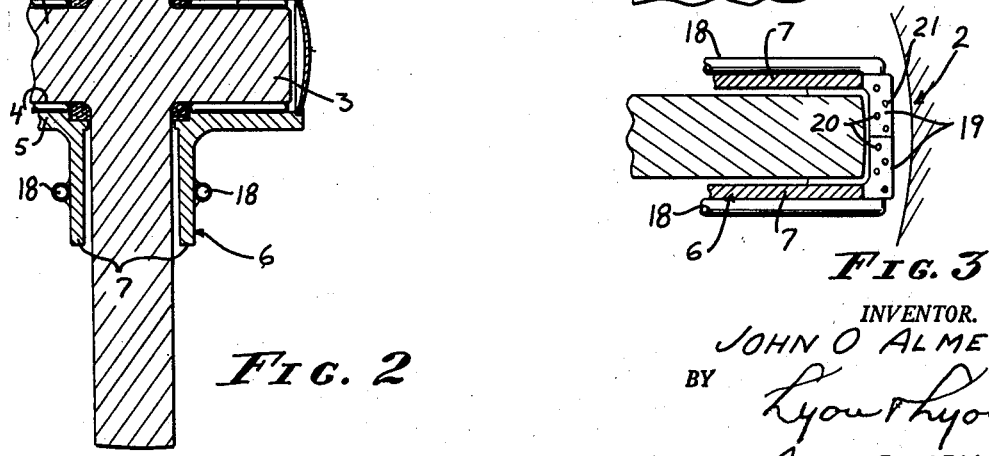
Figure 3 is a fragmentary sectional view through 3—3 of Figure 1.

The means of cooling transmission rollers, which is the subject of the present invention, is an improvement of the invention disclosed in Patent No. 2,131,159 issued September 27, 1938, entitled "Cooling Transmission Rollers." In the above-identified patent details of construction of the transmission as a whole are illustrated, whereas in the present application reference is directed primarily to the transmission roller and its mounting yoke.

The transmission disclosed in the above-identified patent includes one or more sets of transmission rollers or disks 1 which are relatively large in diameter as compared to the axial dimensions. The periphery of each transmission roller defines a zone of a sphere and is adapted to ride in a toroidal concave raceway 2 of a pair of opposed race members, the construction of which is more fully disclosed in the above-identified patent.

Each transmission roller 1 is provided with a pair of opposed stub shafts 3 which receive needle bearings 4 fitted within bearing housings 5 formed in the extremities of a carrier yoke assembly 6.

Each carrier yoke assembly 6 includes mating frames 7 which overlie opposite sides of the transmission rollers 1 and comprise three radiating arms 8, 9, and 10. The radial extremities of the arms of the two mating frames are joined together by bolts 11.

The pair of radiating arms 8 define a socket 12 directed substantially tangentially with respect to the transmission rollers and arranged to receive a pivot pin 13 which extends into a frame structure 14, shown fragmentarily in Figure 1 but more completely disclosed in the above-identified patent.

The frame structure 14 includes a lubricant passage 15 from a source of lubricant shown in the above-identified patent. The lubricant passage communicates with a bore 16 through the pivot pin 13. The arms 8 are provided with passages 17 which lead from the socket 12 to the needle bearing housings 5. Branch passages 18 lead from the passages 17 along the arms 9 and 10.

The arms 9 and 10 are provided with offset portions 19 which overlie the periphery of the transmission rollers and are located at points offset from the two lines of contact between the transmission rollers and the raceways 2 in the direction of rotation of the transmission rollers. The offset portions are provided with diverging ports 20 and 21 which are directed, respectively, against the periphery of the rollers and the raceways. The lubricant streams issuing from the two sets of ports 20 and 21 strike these surfaces and then are forced by the surfaces of the rollers and raceways to converge toward the two regions of contact between the transmission rollers and the raceways. As a consequence, each portion of the periphery of the transmission roller as it moves away from contact with the raceway and each portion of the raceway immediately after it has been engaged by the roller is washed by the lubricant.

The transmission casing in which the race members and transmission rollers are located is maintained in an essentially "dry" condition. That is, the lubricant, once it has been discharged from the ports 20 and 21, is free to drain clear of the race members and transmission rollers. In fact, the excess lubricant is forced from the raceways and transmission rollers by centrifugal force due to rotation of the transmission rollers and the raceways. Thus the only portions which receive direct application of lubricant are those portions which were, during the immediately preceding instant, in mutual bearing contact.

The time interval between mutual bearing contact and application of coolant is so short an interval that the heat generated by reason of such contact does not have time to penetrate into the surfaces of the transmission rollers or the raceways; instead, the lubricant, as it washes these surfaces, immediately extracts the heat therefrom. In other words, the function of the lubricant is that of an effective coolant which carries away the heat before it can penetrate into the body of the metal comprising the transmission rollers or the race members. The lubricant or coolant which has been thus heated is immediately drawn to the walls of the transmission casing where it may be collected, and if necessary passed through a suitable heat exchanger for reuse.

It will thus be seen that the method of cooling the transmission rollers and their raceways consists essentially in directing a fluid lubricant-coolant against those surfaces of the raceways and transmission rollers which, during the immediately preceding instant, were in mutual bearing contact, and then utilizing the centrifugal force generated by the rotation of the rollers and raceways to carry the heated lubricant away from these members before the lubricant can retransfer the heat energy it has absorbed back to these members.

It will be observed that during the passage of lubricant at any point of the transmission rollers from one raceway to the other, all excess lubricant is thrown clear of the periphery of each transmission roller, and that the raceways also are continuously cleaned of excess lubricant, so that there is a minimum amount of lubricant on the surfaces of the transmission rollers and raceways as any portion thereof approaches bearing contact with the other. As a consequence, the force which may be transmitted from one race member to the set of transmission rollers and from the set of transmission rollers to the other race member is maintained at a maximum.

It will also be observed that the lubricant or coolant jets are always in the desired position regardless of the iclination of the rollers with respect to their raceways, so that for all speed ratio changes between the driving and driven race members lubrication and cooling is maintained at maximum efficiency.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. In a transmission having opposed toroidal raceways, transmission rollers interposed therebetween, a frame structure, and supporting yokes for positioning said rollers, said frame structure and yokes defining lubricant supply passages, the combination of: nozzle means in communication with said supply passages and overlying the peripheries of said rollers contiguous to regions thereof in bearing contact with said raceways and at the sides of the regions of bearing contact wherein said bearing surfaces of said rollers are moving in diverging paths from said raceways.

2. In a transmission having opposed toroidal raceways, transmission rollers interposed between said raceways, and supporting and lubricant supply means for said rollers, the combination of: yoke frames overlying opposite sides of said rollers and including swivel connections for joining said yoke frames to said supporting means, and defining coolant passages communicating with said supply means; said yoke frames including bearings for said rollers and arms extending to the peripheries of said rollers, and having nozzle means contiguous to the regions of bearing contact between said rollers and said raceways at the sides of the regions of bearing contact, wherein said roller surfaces move in a diverging path relative to said raceways and directed toward said regions of bearing contact; said yoke frame passages communicating with said nozzle means.

3. In a transmission having opposed toroidal raceways and transmission rollers interposed between said raceways, and defining regions of mutual bearing contact which progress about the peripheries of said rollers and around said raceways, there being contiguous regions immediately following said regions of bearing contact wherein the surfaces of said rollers and raceways move in diverging relation, the combination of: nozzles located at each of said contiguous regions and oriented to direct streams of coolant lubricant toward said regions of bearing contact for impingement on the surfaces of said rollers and raceways immediately following bearing contact between these surfaces, thereby to extract the heat from said surfaces generated by reason of said bearing contact.

4. The combination with a roller member and a raceway engaged thereby, of: nozzle means disposed in fixed relation with the axis of said roller member and positioned to direct a coolant lubricant in the region wherein the periphery of said roller moves in diverging relation with said raceway.

5. In a transmission having a raceway and a transmission roller engageable with said raceway to define a region of mutual bearing contact which progresses about the peripheral surface of said roller and surface of said raceway, there being a contiguous region wherein the surfaces of said roller and raceway move in diverging relation, the combination of: a nozzle located at said contiguous region and oriented to direct coolant lubricant toward said region of bearing contact for impingement on the surfaces of said roller and raceway immediately following bearing contact between these surfaces, thereby to extract heat from said surfaces generated by reason of said bearing contact.

References Cited in the file of this patent

UNITED STATES PATENTS

| | | |
|---|---|---|
| 1,981,910 | Ehrlich | Nov. 27, 1934 |
| 2,132,751 | Murden | Oct. 11, 1938 |